(12) United States Patent
Xiang (10) Patent No.: US 9,911,388 B2
(45) Date of Patent: Mar. 6, 2018

(54) PIXEL STRUCTURE, ARRAY SUBSTRATE AND DISPLAY DEVICE COMPRISING THE SAME

(71) Applicants: XIAMEN TIANMA MICRO-ELECTRONICS CO., LTD., Xiamen (CN); TIANMA MICRO-ELECTRONICS CO., LTD., Shenzhen (CN)

(72) Inventor: Chunping Xiang, Xiamen (CN)

(73) Assignees: XIAMEN TIANMA MICRO-ELECTRONICS CO., LTD., Xiamen (CN); TIANMA MICRO-ELECTRONICS CO., LTD., Shenzhen (CN)

( * ) Notice: Subject to any disclaimer, the term of this patent is extended or adjusted under 35 U.S.C. 154(b) by 38 days.

(21) Appl. No.: 14/981,958

(22) Filed: Dec. 29, 2015

(65) Prior Publication Data

US 2017/0062517 A1 Mar. 2, 2017

(30) Foreign Application Priority Data

Aug. 28, 2015 (CN) .......................... 2015 1 0540916

(51) Int. Cl.
*G09G 3/36* (2006.01)
*G09G 3/20* (2006.01)

(52) U.S. Cl.
CPC ............. *G09G 3/36* (2013.01); *G09G 3/2003* (2013.01); *G02F 2201/52* (2013.01); *G09G 2300/0452* (2013.01); *G09G 2340/0457* (2013.01)

(58) Field of Classification Search
CPC .................................................. G02B 27/2214
See application file for complete search history.

(56) References Cited

U.S. PATENT DOCUMENTS

| 2011/0043615 | A1* | 2/2011 | Saishu | ............... | H04N 13/0404 348/51 |
| 2012/0200795 | A1* | 8/2012 | Takatori | ............ | G02B 27/2214 349/33 |
| 2012/0229456 | A1* | 9/2012 | Takahashi | .......... | H04N 13/0404 345/419 |

FOREIGN PATENT DOCUMENTS

CN 104658433 A 5/2015

* cited by examiner

*Primary Examiner* — Olga Merkoulova
(74) *Attorney, Agent, or Firm* — Kilpatrick Townsend & Stockton LLP (57) ABSTRACT

The present application discloses a pixel structure, an array substrate and a display device comprising the same. The pixel structure comprises a pixel array comprising a first array section and a second array section alternatively arranged along a first direction; the first array section comprises at least one first pixel sequence extending along a second direction and at least one second pixel sequence extending along the second direction; the second array section comprises at least one third pixel sequence extending along the second direction and at least one fourth pixel sequence extending along the second direction. According to the present application, the brightness centers are uniformly distributed in the pixel array, thereby resulting in a more uniform brightness and a reduction of the sub-pixels' dark state light leakage when an image is displayed.

14 Claims, 7 Drawing Sheets

Fig. 1

(Prior Art)

Fig. 2

(Prior Art)

PIXEL STRUCTURE, ARRAY SUBSTRATE AND DISPLAY DEVICE COMPRISING THE SAME

The present application claims the priority to Chinese Patent Application No. 201510540916.0, filed on Aug. 28, 2015 with the State Intellectual Property Office of the People's Republic of China, which is incorporated herein by reference in its entirety.

TECHNICAL FIELD

The present disclosure generally relates to display technologies, and more specifically to a pixel structure, an array substrate and a display device comprising the same.

BACKGROUND OF THE APPLICATION

The SPR (Sub Pixel Rendering) technology uses an optimized arrangement of red (R), green (G) and blue (B) sub-pixels in combination with a corresponding display algorithm for processing image information, result in a display panel having a higher PPI (Pixel Per Inch) display effect.

Furthermore, the SPR technology can reduce the process complexity and increase the product yield while improving the visual effect of the display panel and reducing the power consumption.

The existing SPR pixel designs need to consider the correspondence between their brightness centers and the brightness centers of the real RGB arrangement. In order to enable the brightness centers to be uniformly distributed in the pixel array, an arrangement pattern as shown in FIG. 1 is generally employed.

Figure 1:
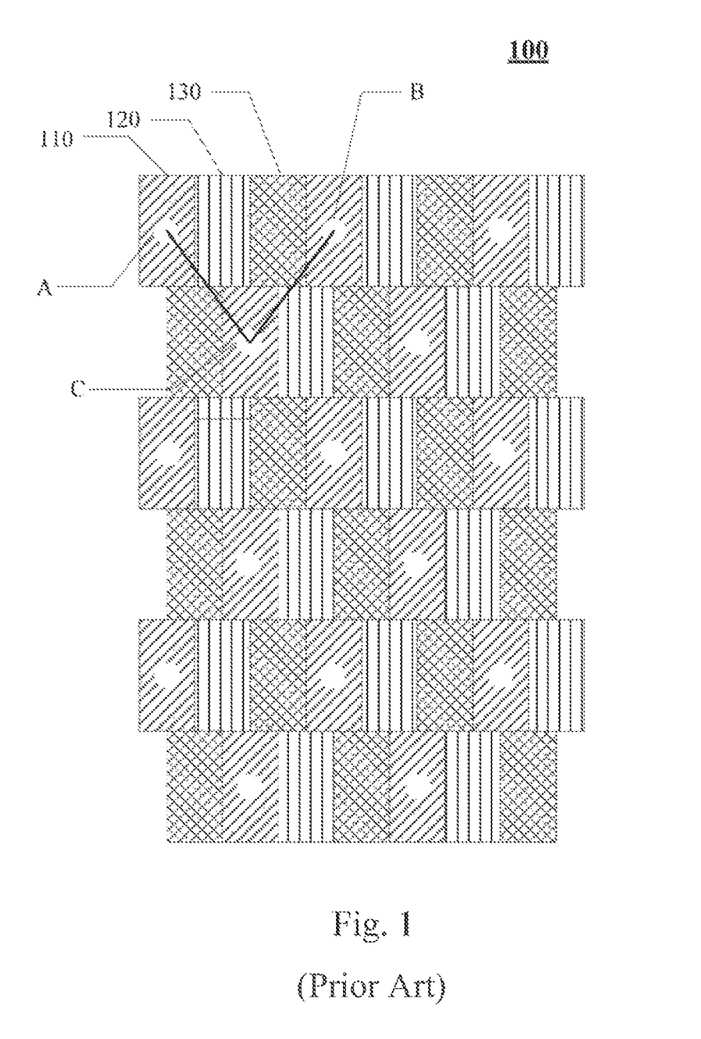
FIG. 1 illustrates a schematic structure diagram of an SPR pixel array in prior art.

FIG. 1 shows a presently frequently used SPR pixel array. In the pixel array as shown in FIG. 1, each kind of the fill patterns represents one color fill. For example, sub-pixel 110 is a green (G) sub-pixel, sub-pixel 120 is a blue (B) sub-pixel and sub-pixel 130 is a red (R) sub-pixel. When using the pixel array as shown in FIG. 1, the G sub-pixels are uniformly distributed in the pixel array. As a result, because each of the brightness centers (e.g. the brightness centers A, B, and C) of the pixel array is located at the geometric center of each G sub-pixel, the distances between one brightness center (e.g. brightness center C) and its adjacent brightness centers (e.g. brightness centers A and B) are equal (i.e., AC=BC).

However, when the pixel array as shown in FIG. 1 is implemented in practical applications, each of the sub-pixels will incline notably in its entirety to facilitate the data line arrangement. The pixel array as shown in FIG. 1 is arranged as shown in FIG. 2 in practice.

Figure 2:
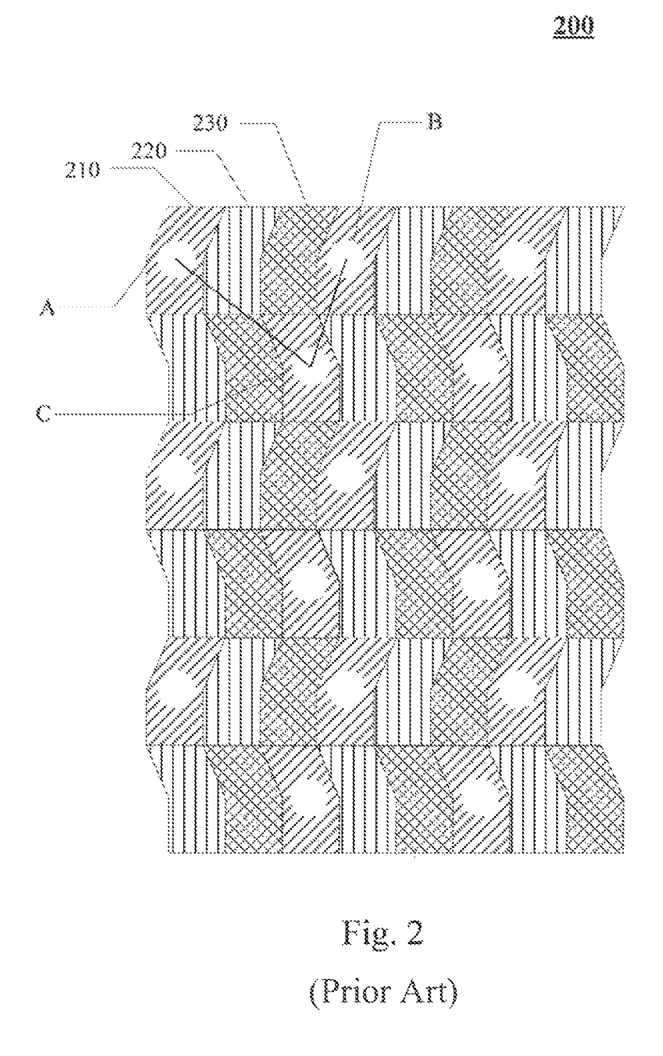
FIG. 2 illustrates a structure diagram of the sub-pixel arrangement of the SPR pixel array of FIG. 1 when implemented.

In the pixel array as shown in FIG. 2, similar to the pixel array of FIG. 1, each kind of the fill patterns represents one color fill. For example, sub-pixel 210 is a green (G) sub-pixel, sub-pixel 220 is a blue (B) sub-pixel and sub-pixel 230 is a red (R) sub-pixel. In practical applications, due to the incline of each sub-pixel, the brightness centers are not equidistantly distributed in the pixel array. In other words, the distances between the brightness center C and its two adjacent brightness centers A and B are not equal, i.e., AC≠AB. The desired effect at design that the brightness centers are uniformly distributed in the pixel array is not achieved. Furthermore, when using the pixel array as shown in FIG. 2, in order to achieve a larger aperture ratio, light leakage in the dark state is prone to occur during display, due to the large bending angle of the data line.

SUMMARY OF THE APPLICATION

In view of the above defects or deficiencies in the existing technologies, it is desirable to provide a pixel structure, an array substrate and a display device comprising the same in order to solve at least one of the technical problems described above.

In a first aspect, the present application provides a pixel structure comprising an pixel array, the pixel array comprising: a first array section and a second array section arranged alternately along a first direction, the first array section comprising at least one first pixel sequence extending along a second direction and at least one second pixel sequence extending along the second direction, the second array section comprising at least one third pixel sequence extending along the second direction and at least one fourth pixel sequence extending along the second direction, each of the pixel sequences comprising a plurality of repeatedly arranged sub-pixels, each of the sub-pixels in the first pixel sequence having a first parallelogram shape with a short side extending along the second direction, and each of the sub-pixels in the second pixel sequence having a second parallelogram shape with a short side extending along the second direction, and each of the sub-pixels in the third pixel sequence having a third parallelogram shape with a short side extending along the second direction, and each of the sub-pixels in the fourth pixel sequence has a fourth parallelogram shape with a short side extending along the second direction.

In a second aspect, the present application further provides an array substrate comprising a scan line, a data line intersecting with and insulated from the scan line, and the pixel structure as described above.

In a third aspect, the present application further provides a display device comprising the array substrate as described above, and an opposing substrate opposing the array substrate.

In the pixel structure, the array substrate and the display device comprising the same provided in the embodiments of the present application, the brightness centers are uniformly distributed in the pixel array, thereby resulting in a more uniform brightness distribution when an image is displayed.

Furthermore, in the pixel structure according to an embodiment of the present application, each sub-pixel is of a regular shape, thereby avoiding the dark state light leakage caused by the bending angle of the data line in the existing technologies and further improving the display effect.

BRIEF DESCRIPTION OF THE DRAWING

Other features, purposes and advantages of the present application will become more apparent by reading the detailed description of the non-limiting embodiments in conjunction with the following accompanying drawings, among which.

DETAILED DESCRIPTION

The following detailed description is provided with reference to the accompanying drawings and embodiments. It should be appreciated that the embodiments described herein are provided to illustrate the present invention, but not to limit the present invention. In addition, it should be noted that only the related parts of the present invention are shown in the accompanying drawings for ease of description.

It should be noted that the embodiments and features of the embodiments in the present application, on a non-conflicting basis, may be combined. The present application will be discussed in details below with reference to the accompanying drawings.

Figure 3:
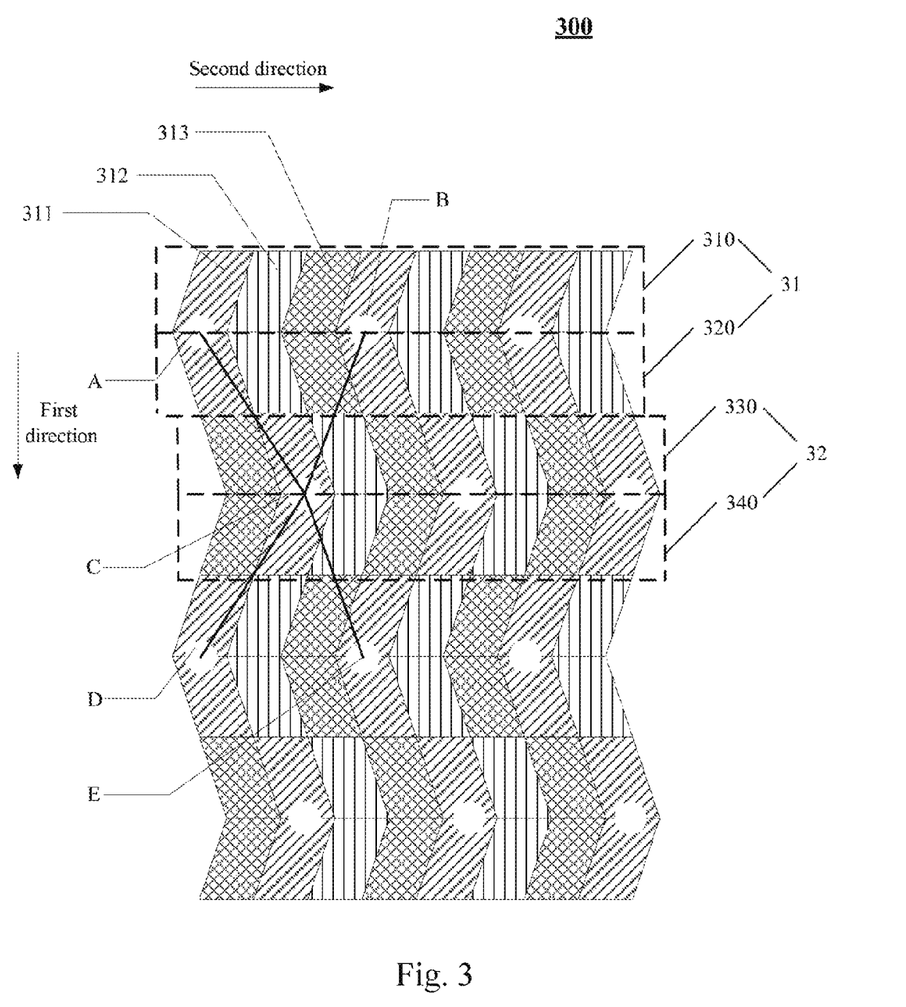
FIG. 3 illustrates a schematic structure diagram of the pixel array in the pixel structure according to an embodiment of the present application.

FIG. 3 illustrates a schematic structure diagram of a pixel array 300 in a pixel structure according to an embodiment of the present application.

The pixel array 300 shown in FIG. 3 comprises a first array section 31 and a second array section 32 which are alternately arranged along a first direction.

The first array section 31 may comprise at least one first pixel sequence 310 extending along a second direction and at least one second pixel sequence 320 extending along the second direction.

The second array section 32 may comprise at least one third pixel sequence 330 extending along the second direction and at least one fourth pixel sequence 340 extending along the second direction.

Each of the pixel sequences (i.e., the first pixel sequence 310, the second pixel sequence 320, the third pixel sequence 330, and the fourth pixel sequence 340) comprises a plurality of repeatedly arranged sub-pixels.

For example, in some available implementations, each of the pixel sequences may comprise a first color sub-pixel 311, a second color sub-pixel 312 and a third color sub-pixel 313 which are regularly repeated along the second direction.

It should be noted that the same fill pattern in the drawings represents the same color sub-pixel in the present embodiment and the following description.

Still referring to FIG. 3, each of the sub-pixels in the first pixel sequence 310 has a first parallelogram shape with a short side extending along the second direction, and each of the sub-pixels in the second pixel sequence 320 has a second parallelogram shape with a short side extending along the second direction.

Each of the sub-pixels in the third pixel sequence 330 has a third parallelogram shape with a short side extending along the second direction, and each of the sub-pixels in the fourth pixel sequence 340 has a fourth parallelogram shape with a short side extending along the second direction.

In the pixel array 300 shown in FIG. 3, each of the sub-pixels has a parallelogram shape. Therefore, when the pixel structure comprising the pixel array 300 is implemented in an array substrate and a display device, the date line will not be bended within the region of a sub-pixel, thereby avoiding dark state light leakage being generated when an image is displayed while ensuring an aperture ratio, which leads to an improved display effect.

In the embodiment as shown in FIG. 3 and the following embodiments, the first direction may be, for example, a horizontal direction or a vertical direction, and the second direction is perpendicular to the first direction.

Figure 4:
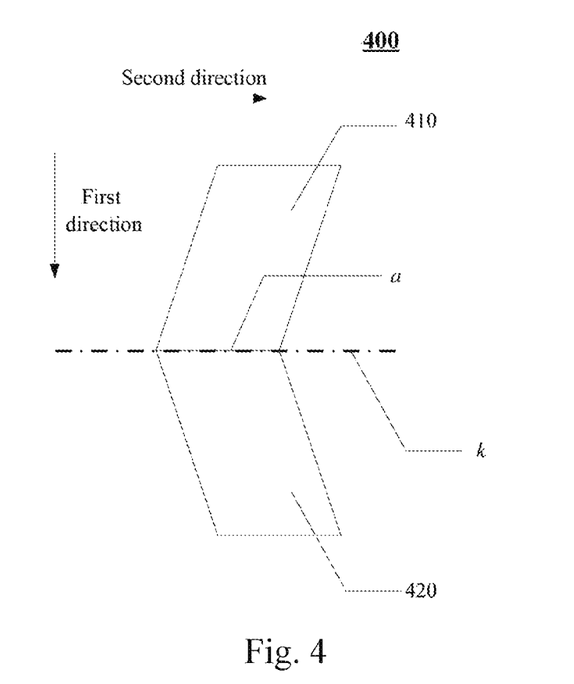
FIG. 4 illustrates a schematic structure diagram of the spatial relationship between a first sub-pixel in a first pixel sequence and a second sub-pixel in a second pixel sequence as shown in the embodiment of FIG. 3.

FIG. 4 illustrates a schematic structure diagram 400 of the spatial relationship between a first sub-pixel in a first pixel sequence and a second sub-pixel in a second pixel sequence as shown in FIG. 3.

Here, it should be noted that the description of the colors of the first and the second sub-pixels is omitted in order to make the spatial relationship between the first and the second sub-pixels more obvious.

As shown in FIG. 4, a first sub-pixel 410 in the first pixel sequence and a second sub-pixel 420 in the second pixel sequence corresponding to the first sub-pixel 410 have an overlapped first short side a, and the first sub-pixel 410 and the second sub-pixel 420 are axially symmetrical about the first short side a. Here, the first sub-pixel 410 is any one of the sub-pixels in the first pixel sequence.

Similar to the spatial relationship between the first sub-pixel 410 in the first pixel sequence and the second sub-pixel 420 in the second pixel sequence corresponding to the first sub-pixel 410 as shown in FIG. 4, a third sub-pixel in the third pixel sequence and a fourth sub-pixel in the fourth pixel sequence corresponding to the third sub-pixel also may have an overlapped second short side, and the third sub-pixel and the fourth sub-pixel are axially symmetrical about the second short side. Here, the third sub-pixel is any one of the sub-pixels in the third pixel sequence. The length of the first short side a is equal to that of the second short side.

By employing the spatial relationship as described above, it is apparent that the area of the first sub-pixel in the first pixel sequence is equal to that of the second sub-pixel in the second pixel sequence, since the first sub-pixel in the first pixel sequence and the second sub-pixel in the second pixel sequence are axially symmetrical about the first short side.

Likewise, the third sub-pixel in the third pixel sequence and the fourth sub-pixel in the fourth pixel sequence corresponding to the third sub-pixel are axially symmetrical about the second short side. It is apparent that the area of the third sub-pixel in the third pixel sequence is equal to that of the fourth sub-pixel in the fourth pixel sequence corresponding to the third pixel.

Figure 5:
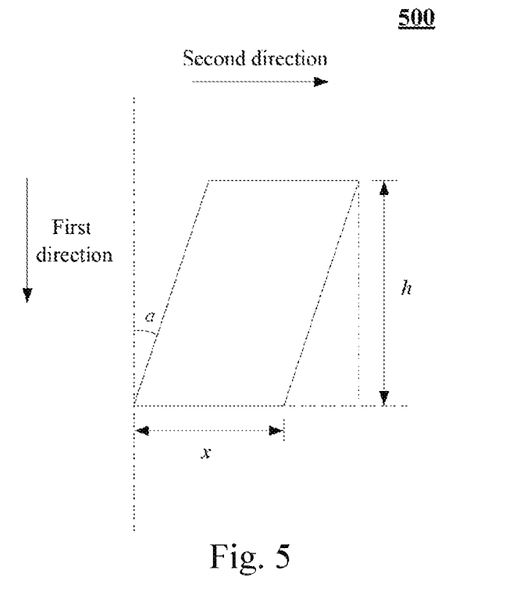
FIG. 5 illustrates a schematic structure diagram of the first sub-pixel in the first pixel sequence.

FIG. 5 illustrates a schematic structure diagram 500 of a first sub-pixel in a first pixel sequence.

Similar to FIG. 4, the description of the color of the first sub-pixel is omitted to make the structure feature of the first sub-pixel more clear.

As shown in FIG. 5, a ratio of the length x of a first short side of the first parallelogram to a height h of the first parallelogram when the first short side is used as the base is 1:2.

That is, h=2x.

In some available implementations, an angle α between the long side of the first parallelogram and the first direction may be in the range from 9° to 19°. For example, a may be 14°.

In some available implementations, because the second sub-pixel in the second pixel sequence and the first sub-pixel in the first pixel sequence are axially symmetrical about the first short side, a ratio of the length of the first short side of the second sub-pixel (i.e., the second parallelogram) in the second pixel sequence to the height when the first short side is used as the base is also 1:2. Furthermore, the angle between the long side of the second sub-pixel in the second pixel sequence and the first direction is equal to that between the long side of the first parallelogram and the first direction, the range of which is also from 9° to 19°.

In some available implementations, where the ratio of the length x of the first short side of the first parallelogram to the height h of the first parallelogram with the first short side as the base is 1:2, the ratio of the length of the second short side of the third parallelogram to the height of the third parallelogram with the second short side as the base may also be 1:2. The angle between the long side of the third parallelogram and the first direction is in a range from 9° to 19°.

In some application scenarios of the available implementations, the second parallelogram (i.e., the second sub-pixel in the second pixel sequence) and the third parallelogram (i.e., the third sub-pixel in the third pixel sequence) may be, for example, congruent. In these application scenarios, the pixel array is formed as shown in FIG. 6.

Figure 6:
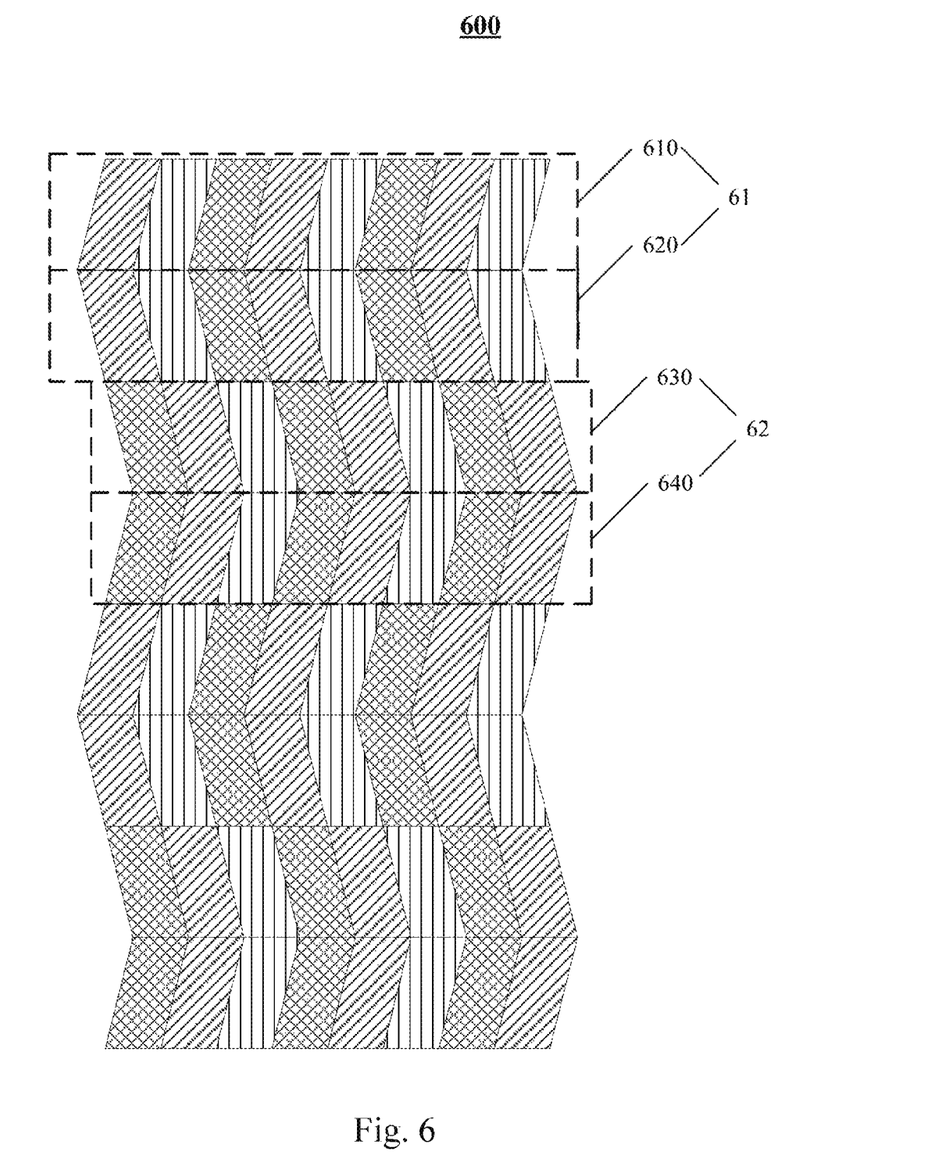
FIG. 6 illustrates a schematic structure diagram of a pixel array in a pixel structure according to another embodiment of the present application.

Similar to the embodiment of FIG. 3, the pixel array 600 of FIG. 6 also comprises a first array section 61 and a second array section 62. The first array section 61 may comprise at least one first pixel sequence 610 extending along the second direction and at least one second pixel sequence 620 extending along the second direction.

The second array section 62 may comprise at least one third pixel sequence 630 extending along the second direction and at least one fourth pixel sequence 640 extending along the second direction.

Each of the pixel sequences (i.e., the first pixel sequence 610, the second pixel sequence 620, the third pixel sequence 630, and the fourth pixel sequence 640) comprises a plurality of repeatedly arranged sub-pixels.

In the present embodiment, the first parallelogram and the second parallelogram corresponding to the first parallelogram are axially symmetrical about the first short side, and the third parallelogram and the fourth parallelogram are axially symmetrical about the second short side. Because the length of the first short side is equal to that of the second short side, the areas of the respective first, second, third and fourth parallelograms are equal.

Furthermore, in the present embodiment, the angel between the long side of the first parallelogram and the first direction is in a range from 9° to 19°, for example, 14°. The angle between the long side of the third parallelogram and the first direction may also be in a range from 9° to 19°, for example, 14°. Therefore, in some available implementations, the angle between the long side of the first parallelogram and the first direction is equal to that between the long side of the third parallelogram and the first direction. Further, because the first parallelogram and the second parallelogram are axially symmetrical about the first short side, the second parallelogram and the third parallelogram may be congruent and the first parallelogram and the fourth parallelogram may be congruent in some available implementations.

Similarly, in some other available implementations, a ratio of the length of the first short side of the first parallelogram to the height of the first parallelogram when the first short side is used as the base may be 2:3. The angle between the long side of the first parallelogram and the first direction may be in a range from 24° to 34°, for example, 29°. In these available implementations, a ratio of the length of the second short side of the third parallelogram and the height of the third parallelogram when the second short side is used as the base may also be set as 2:3. The angle between the long side of the third parallelogram and the first direction may be in a range from 24° to 34°, for example, 29°.

Figure 7:
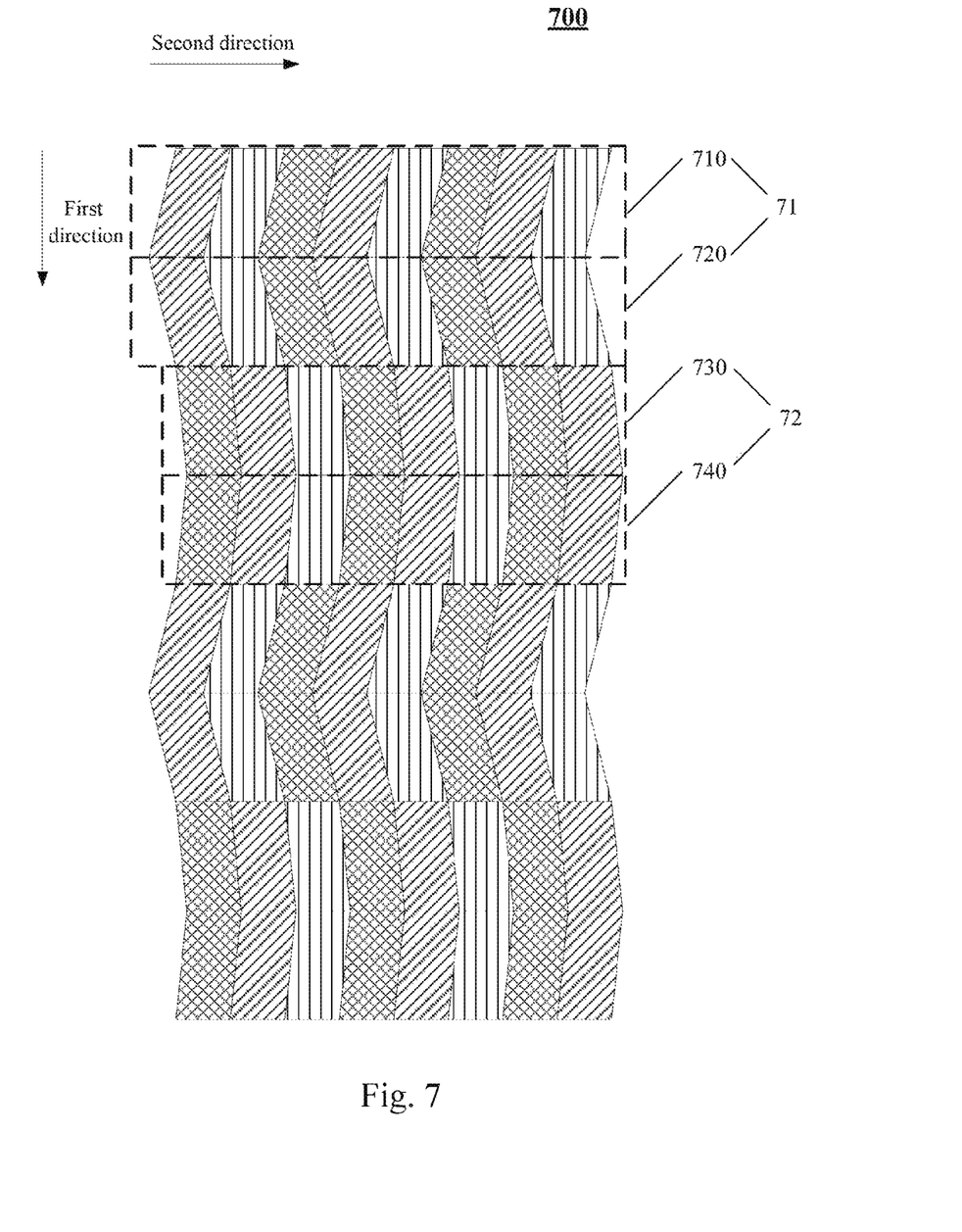
FIG. 7 illustrates a schematic structure diagram of a pixel array in a pixel structure according to yet another embodiment of the present application.

FIG. 7 illustrates a schematic structure diagram of a pixel array 700 in a pixel structure according to yet another embodiment of the present application.

Similar to the embodiments of FIG. 3 and FIG. 6, the pixel array 700 of FIG. 7 may also comprise a first array section 71 and a second array section 72. The first array section 71 may comprise at least one first pixel sequence 710 extending along the second direction and at least one second pixel sequence 720 extending along the second direction.

The second array section 72 may comprise at least one third pixel sequence 730 extending along the second direction and at least one fourth pixel sequence 740 extending along the second direction.

Each of the sub-pixels in the first pixel sequence 710 has a first parallelogram shape, each of the sub-pixels in the second pixel sequence 720 has a second parallelogram shape, each of the sub-pixel in the third pixel sequence 730 has a third parallelogram, and each of the sub-pixels in the fourth pixel sequence 740 has a fourth parallelogram shape.

In the present embodiment, the area of the third parallelogram is equal to that of the first parallelogram.

For example, when the length of the first short side of the first parallelogram is x, the height when the first short side is used as a base is h, and x:h=1:2, because the length of the second short side is equal to that of the first short side and the area of the third parallelogram is equal to that of the first parallelogram, a ratio of the length of the second short side of the third parallelogram to the height of the third parallelogram when the second short side is used as the base is also 1:2. In this case, the angle between the long side of the first parallelogram and the first direction is in a range from 9° to 19°, for example, 14°.

Alternatively, when the length of the first short side of the first parallelogram is x, the height when the first short side is used as the base is h, and x:h=2:3, because the length of the second short side is equal to that of the first short side and the area of the third parallelogram is equal to that of the first parallelogram, a ratio of the length of the second short side of the third parallelogram to the height of the third parallelogram when the second short side is used as the base also is 2:3. In this case, the angle between the long side of the first parallelogram and the first direction may be in a range from 24° to 34°, for example, 29°.

In some available implementations of the present embodiment, the angle between the long side of the third parallelogram and the first direction may be, for example, in a range from 4° to 6°. For example, the angle may be 5°.

Here, it should be noted that although the angel between the long side of each parallelogram (i.e., the first parallelogram, the second parallelogram, the third parallelogram, and the fourth parallelogram) and the first direction is limited in the above description, there may be two kinds of parallelograms that have the same angle relative to the first direction. For example, in the embodiments as shown in FIG. 3 and FIG. 6, the angle between the long side of each sub-pixel (corresponding to the first parallelogram) in the first pixel sequences 310, 610 and the first direction is equal to that between the long side of each sub-pixel (corresponding to the second parallelogram) of the second pixel sequences 320, 620 and the first direction. Similarly, in the embodiments as shown in FIG. 3 and FIG. 6, the angle between the long side of each sub-pixel (corresponding to the third parallelogram) of the third pixel sequences 330, 630 and the first direction is equal to that between the angle between the long side of each sub-pixel (corresponding to the fourth parallelogram) of the fourth pixel sequences 340, 640 and the first direction.

Therefore, in the embodiments as shown in FIG. 3 and FIG. 6, the angles between respective parallelograms and the first direction are equal. In some implementations of these embodiments, the first parallelogram and the fourth parallelogram are congruent, and the second parallelogram and the third parallelogram are congruent, as shown in FIG. 3 and FIG. 6. Alternatively, in some other available implementations of these embodiments, the first parallelogram and the third parallelogram are congruent, and the second parallelogram and the fourth parallelogram are congruent.

Figure 8:
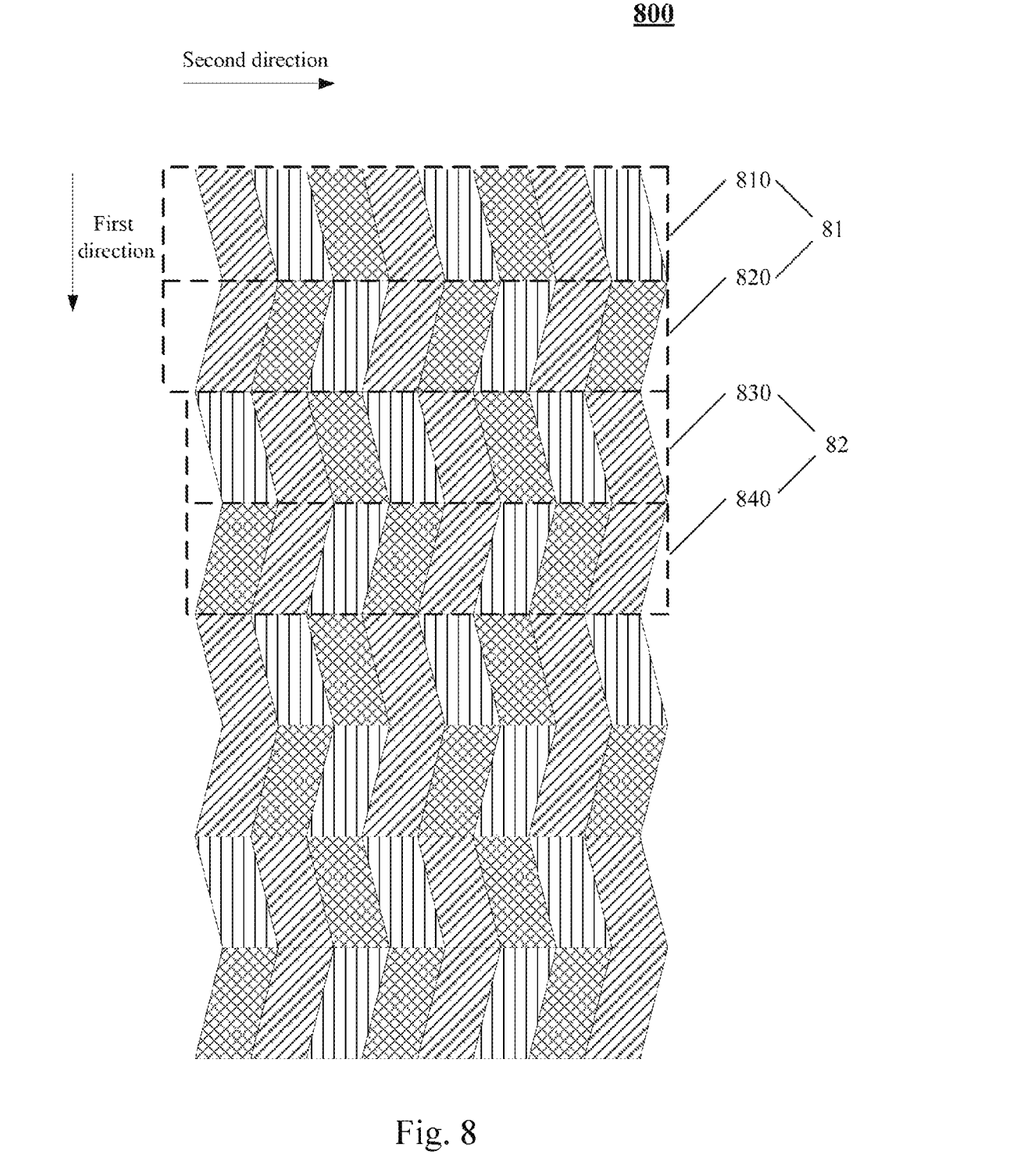
FIG. 8 illustrates a schematic structure diagram of a pixel array in a pixel structure according to still another embodiment of the present application.

FIG. 8 illustrates an arrangement pattern of a pixel array 800 of a pixel structure according to still another embodiment of the present application when the first parallelogram and the third parallelogram are congruent and the second parallelogram and the fourth parallelogram are congruent as described above.

Similar to the embodiments of FIG. 3 and FIG. 6, the pixel array 800 of FIG. 8 also comprises a first array section 81 and a second array section 82. The first array section 81 may comprise at least one first pixel sequence 810 extending along the second direction and at least one second pixel sequence 820 extending along the second direction.

The second array section 82 may comprise at least one third pixel sequence 830 extending along the second direction and at least one fourth pixel sequence 840 extending along the second direction.

Each of the sub-pixels in the first pixel sequence 810 has a first parallelogram shape, each of the sub-pixel of the second pixel sequence 820 has a second parallelogram shape, each of the sub-pixel of the third pixel sequence 830 has a third parallelogram shape, and each of the sub-pixel of the fourth pixel sequence 840 has a fourth parallelogram shape.

The embodiment of FIG. 8 differs from the embodiments of FIG. 3 and FIG. 6 in that, in the embodiment of FIG. 8, the first parallelogram (i.e., the shape of each sub-pixel in the first pixel sequence 810) and the third parallelogram (i.e., the shape of each sub-pixel in the third pixel sequence 830) are congruent, and the second parallelogram (i.e., the shape of each sub-pixel in the second pixel sequence 820) and the fourth parallelogram (i.e., the shape of each sub-pixel in the fourth pixel sequence 840) are congruent.

In some implementations, as shown in FIGS. 3, 6 and 7, the first pixel sequences 310, 610, 710 in the first array sections 31, 61, 71 may comprise a first color sub-pixel, a second color sub-pixel and a third color sub-pixel which are sequentially and repeatedly arranged along the second direction. The second pixel sequences 320, 620, 720 may also comprise a first color sub-pixel, a second color sub-pixel and a third color sub-pixel which are sequentially and repeatedly arranged along the second direction. Here, the second color sub-pixel is, for example, green.

Alternatively, in some other implementations, as shown in FIG. 8, the first pixel sequence 810 may comprise a first color sub-pixel, a second color sub-pixel and a third color sub-pixel which are sequentially and repeatedly arranged along the second direction. The second pixel sequence 820 may comprise a third color sub-pixel, a second color sub-pixel and a first color sub-pixel which are sequentially and repeatedly arranged along the second direction. Here, the second color sub-pixel is, for example, green.

That is, in the implementation as shown in FIG. 8, the position of the green sub-pixel in the first pixel sequence 810 corresponds to that of the green sub-pixel in the second pixel sequence 820, while the position of the red/blue sub-pixel in the first pixel sequence 810 does not correspond to that of the red/blue sub-pixel in the second pixel sequence 820 (i.e., the position of each red sub-pixel in the first pixel sequence 810 corresponds to that of each blue sub-pixel in the second pixel sequence 820).

Similarly, as shown in FIGS. 3, 6 and 7, the third pixel sequences 330, 630, 730 and the fourth pixel sequences 340, 640, 740 in the second array sections 32, 62, 72 respectively comprise a first color sub-pixel, a second color sub-pixel and a third color sub-pixel which are sequentially and repeatedly arranged along the second direction, and the second color sub-pixel is green.

Each of the second color sub-pixels in the second array sections 32, 62, 72 and each of the second color sub-pixels in the first array sections 31, 61, 71 are not adjacent to each other.

Alternatively, as shown in FIG. 8, the third pixel sequence 830 of the second array section comprises a first color sub-pixel, a second color sub-pixel and a third color sub-pixel which are sequentially and repeatedly arranged along the second direction, while the fourth pixel sequence 840 comprises a third color sub-pixel, a second color sub-pixel and a first color sub-pixel which are sequentially and repeatedly arranged along the second direction. Here, the second color sub-pixel is green. That is, the position of the green sub-pixel in the third pixel sequence 830 corresponds to that of the green sub-pixel in the fourth pixel sequence 840, while the position of the red/blue sub-pixel in the third pixel sequence 830 does not correspond to that of the red/blue sub-pixel in the fourth pixel sequence 840 (i.e., the position of the red sub-pixel in the third pixel sequence 830 corresponds to that of the blue sub-pixel in the fourth pixel sequence 840). Each of the second color sub-pixels in the second pixel section 82 and each of the second color sub-pixels in the first pixel section 81 are not adjacent to each other.

In these implementations, the green sub-pixels in respective pixel sequences within the array section are adjacent to each other, but the green sub-pixels in adjacent array sections are not adjacent to each other.

As shown in FIG. 3, assuming that the pixel 311 and the pixels having the same fill pattern as pixel 311 are green sub-pixels, according to the arrangement of sub-pixels as shown in FIG. 3, each of the brightness centers of the pixel arrays in this embodiment is located at the geometric center of two adjacent green sub-pixels, as indicated by A, B, C, D, E in FIG. 3. It can been seen from FIG. 3, the distances from the brightness center C to its adjacent brightness centers A, B, D, E are equal. As a result, the uniform distribution of the brightness centers in the entire pixel array can be guaranteed, and leading to a brightness uniformity when an image is displayed.

Furthermore, the arrangement pattern of the green sub-pixels in the embodiments of FIGS. 6, 7 and 8 is the same as that of the green sub-pixels in the embodiments of FIG. 3, and thus in the embodiments of FIGS. 6, 7 and 8, the uniform distribution of the brightness centers in the entire pixel array can also be guaranteed, and leading to a brightness uniformity at the displaying time.

The structure of the pixel array and the color fill patterns as shown in FIGS. 3, 6, 7 and 8 are only schematic. That is, the color fill pattern as shown in the embodiment of FIG. 8 is also applicable to the pixel arrays in the embodiments as described with reference to FIGS. 3, 6 and 7. Likewise, the color fill patterns as shown in FIGS. 3, 6 and 7 are also applicable to the pixel array in the embodiment as described with reference to FIG. 8.

The present disclosure also discloses an array panel, which comprises a scan line, a data line intersecting with and insulated from the scan line, and the pixel structure as described above.

In the array substrate according to an embodiment of the present application, the scan line may be, for example, perpendicular to the data line. In the pixel array of the pixel structure as described above, the first direction may be, for example, a direction along which the scan line extends; or the first direction may also be a direction along which the data line extends.

The present application also discloses a display device, which comprises the array substrate as described above, and an opposing substrate arranged to be opposed to the array substrate.

The above description is provided for illustrating the preferred embodiments of the present application and the principle thereof. It should be understood by those skilled in the art that the scope of the present application is not limited to the technical solutions through specific combinations of the above-mentioned technical features, but also covers other technical solutions constituted by any combination of the above-mentioned technical features or their equivalents without departing from the described inventive concept of the present invention. For example, the scope of the present application may cover solutions obtained by exchanging the above-mentioned technical features and the technical features including but not limited to those having similar functions disclosed in the present disclosure.

What is claimed is:

1. A pixel structure comprising a pixel array, the pixel array comprising:
   a first array section and a second array section arranged alternately along a first direction,
   the first array section comprising at least one first pixel sequence extending along a second direction and at least one second pixel sequence extending along the second direction, and
   the second array section comprising at least one third pixel sequence extending along the second direction and at least one fourth pixel sequence extending along the second direction, wherein
   each of the pixel sequences comprises a plurality of repeatedly arranged sub-pixels comprising red, green and blue sub-pixels,
   each of the sub-pixels in the first pixel sequence has a first parallelogram shape with a short side extending along the second direction, and each of the sub-pixels in the second pixel sequence has a second parallelogram shape with a short side extending along the second direction, and
   each of the sub-pixels in the third pixel sequence has a third parallelogram shape with a short side extending along the second direction, and each of the sub-pixels in the fourth pixel sequence has a fourth parallelogram shape with a short side extending along the second direction,
   two adjacent green sub-pixels have an overlapped short side and are axially symmetrical to each other about the short side so that each brightness center of the pixel array is located at a geometric center of the two adjacent green sub-pixels.

2. The pixel structure of claim 1, wherein the first pixel sequence has a first sub-pixel and the second pixel sequence has a second sub-pixel corresponding to the first sub-pixel, wherein the first sub-pixel and the second sub-pixel have an overlapped first short side, and the first sub-pixel and the second sub-pixel are axially symmetrical about the first short side, and wherein the first sub-pixel is any one of the sub-pixels in the first pixel sequence.

3. The pixel structure of claim 2, wherein
   the third pixel sequence comprises a third sub-pixel and the fourth pixel sequence comprises a fourth sub-pixel corresponding to the third sub-pixel have an overlapped second short side, and the third sub-pixel and the fourth sub-pixel are axially symmetrical about the second short side, wherein the third sub-pixel is any one of the sub-pixels in the third pixel sequence, and
   a length of the first short side equals a length of the second short side.

4. The pixel structure of claim 3, wherein
   a ratio of the length of the first short side of the first parallelogram to a height of the first parallelogram with the first short side as a base is 1:2; and
   an angle between a long side of the first parallelogram and the first direction is in a range from 9° to 19°.

5. The pixel structure of claim 4, wherein
   a ratio of the length of the second short side of the third parallelogram to a height of the third parallelogram with the second short side as a base is 1:2; and
   an angle between a long side of the third parallelogram and the first direction is in a range from 9° to 19°.

6. The pixel structure of claim 3, wherein
   a ratio of the length of the first short side of the first parallelogram to a height of the first parallelogram with the first short side as a base is 2:3; and
   an angle between a long side of the first parallelogram and the first direction is in a range from 24° to 34°.

7. The pixel structure of claim 6, wherein
   a ratio of the length of the second short side of the third parallelogram to a height of the third parallelogram with the second short side as a base is 2:3; and
   an angle between a long side of the third parallelogram and the first direction is in a range from 24° to 34°.

8. The pixel structure of claim 4, wherein
   an area of the third parallelogram equals an area of the first parallelogram, and the angle between the long side of the third parallelogram and the first direction is in a range from 4° to 6°.

9. The pixel structure of claim 3, wherein
   the first pixel sequence comprises a first color sub-pixel, a second color sub-pixel and a third color sub-pixel which are sequentially and repeatedly arranged along the second direction, and
   the second pixel sequence comprises the first color sub-pixel, the second color sub-pixel and the third color sub-pixel which are sequentially and repeatedly arranged along the second direction, and
   wherein the second color sub-pixel is green.

10. The pixel structure of claim 3, wherein
    the first pixel sequence comprises a first color sub-pixel, a second color sub-pixel and a third color sub-pixel which are sequentially and repeatedly arranged along the second direction, and
    the second pixel sequence comprises the third color sub-pixel, the second color sub-pixel and the first color sub-pixel which are sequentially and repeatedly arranged along the second direction, and
    wherein the second color sub-pixel is green.

11. The pixel structure of claim 9, wherein
the third pixel sequence and/or the fourth pixel sequence in the second array section respectively comprise the first color sub-pixel,
the second color sub-pixel and the third color sub-pixel are sequentially and repeatedly arranged along the second direction, or the third color sub-pixel, the second color sub-pixel and the first color sub-pixel are sequentially and repeatedly arranged along the second direction, wherein the second color sub-pixel is green, and
each of the second color sub-pixels in the second array section and each of the second color sub-pixels in the first array section are not adjacent to each other.

12. The pixel structure of claim 1, wherein
the first direction is a horizontal direction or a vertical direction, and the second direction is perpendicular to the first direction.

13. An array substrate, comprising a scan line, a data line intersecting with and insulated from the scan line, and the pixel structure of claim 1.

14. A display device, comprising the array substrate of claim 13, and an opposing substrate opposing the array substrate.

\* \* \* \* \*